UNITED STATES PATENT OFFICE.

AUG. SEVERIN, OF NEW YORK, N. Y., ASSIGNOR TO HIMSELF AND FREDERICK ZARNFALLER, OF SAME PLACE.

IMPROVEMENT IN REMEDIES FOR RHEUMATISM.

Specification forming part of Letters Patent No. 171,054, dated December 14, 1875; application filed October 8, 1875.

*To all whom it may concern:*

Be it known that I, AUG. SEVERIN, of the city, county, and State of New York, have invented a new and Improved Medical Compound, of which the following is a specification:

My improved medical compound is for the cure of rheumatism, and is composed of the following ingredients, in about the proportions stated, but said proportions may be varied to some extent: Iodide of potassium, four drams; extract of aconite, solid, one dram; wine of colchicum-seed, four drams; morphine, two grains; and of compound sirup of sarsaparilla, enough to make four ounces, together with the other ingredients.

Having thus described my invention, I claim as new and desire to secure by Letters Patent—

The composition of iodide of potassium, solid extract of aconite, wine of colchicum, morphine, and compound sirup of sarsaparilla, substantially in the proportions herein described.

AUG. SEVERIN.

Witnesses:
   LOUIS ERNST,
   CHARLES ZARNFALLER.